Patented Aug. 8, 1939

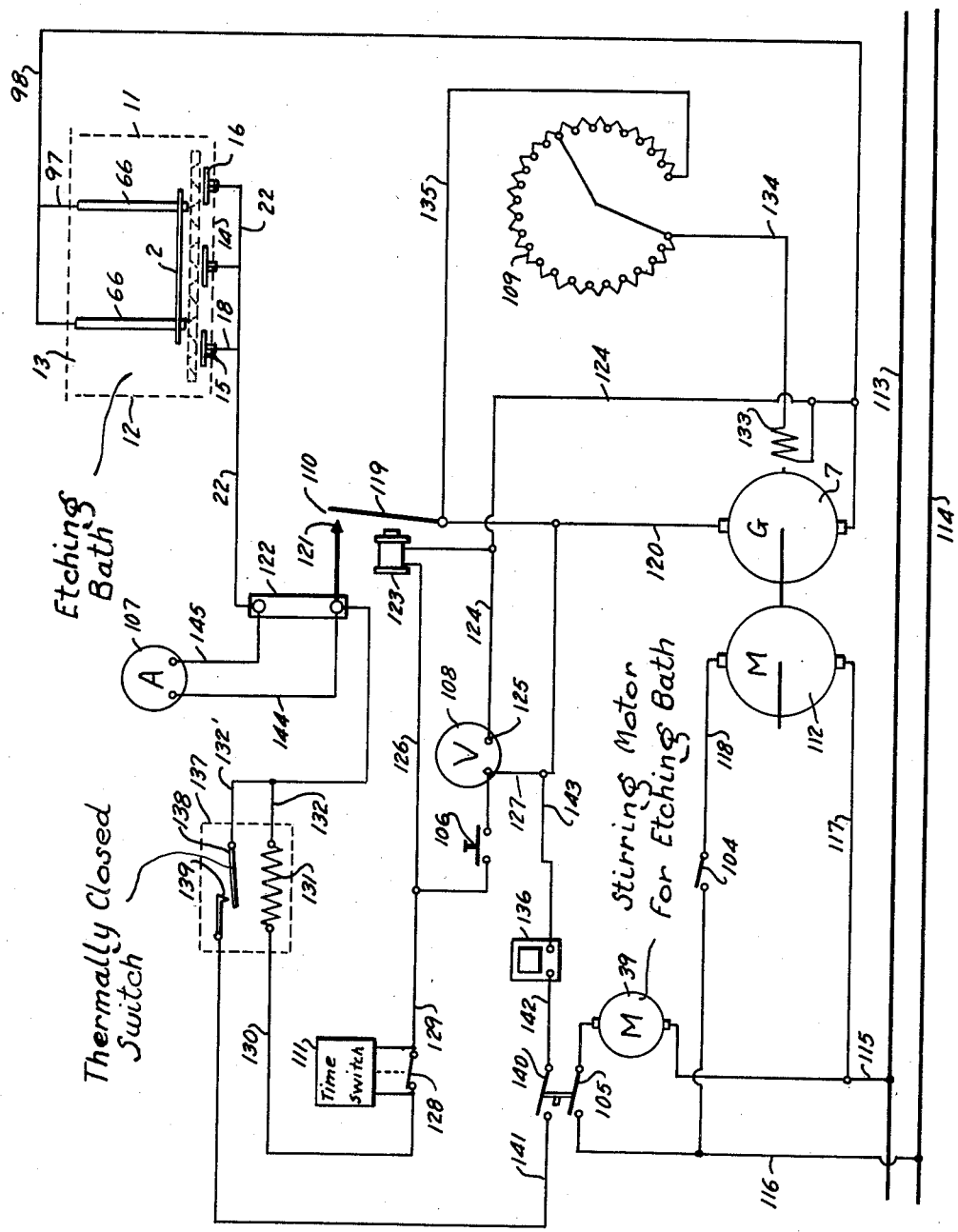

2,168,407

UNITED STATES PATENT OFFICE 2,168,407

APPARATUS FOR ETCHING PLATES

Louis E. Holland, Kansas City, Mo.

Application September 3, 1935, Serial No. 38,926

4 Claims. (Cl. 177—311)

This invention relates to automatically controlled electric circuits, for example circuits employed in electrical etching apparatus, and has for its principal objects to provide a circuit of this character with automatic means for suspending flow of current after a predetermined time interval; to provide for signalling suspension of the current flow so that an operator need not be in constant watch of the apparatus; and to allow actuation of the signal for a predetermined time interval after the signal has not been responded to.

In accomplishing these and other objects of the invention, I have provided improved details of structure, the preferred form of which is illustrated in the accompanying drawing, wherein:

The single figure is a wiring diagram of an automatically controlled circuit embodying the features of the present invention and showing the circuit in association with an electrical etching apparatus.

Referring more in detail to the drawing:

1 designates a timing and signalling circuit embodying the features of the present invention and which is especially suitable for use in connection with an electrical etching apparatus wherein a plate 2 to be etched is supported in a tank 11, consisting of side, end and bottom walls 12, 13 and 14 completely protected on both the inner and outer sides from attack of an electrolyte solution contained therein and in which the plate is immersed.

Mounted on the bottom of the tank, and supported in spaced relation therewith on suitable insulators 15, is a series of cathodes 16. Each cathode 16 is constructed of conductive material and includes a bar of sufficient length to extend substantially across the width of the tank and has a flat upper portion 17 exposed to the electrolyte solution to collect current passing from the plate across the electrolyte, as later described. The respective ends of each cathode are provided with terminals 18 that extend through the insulators and connect with bus bars 20 to which is connected a suitable conductor 22 supplying current.

The plate 2 is oscillatably mounted on a reciprocatory frame 46 carrying an agitator 40 for effecting agitation of the electrolyte, the frame being actuated by a motor 39 to effect oscillation of the plate and actuation of the agitator. The plate 2 is connected by terminal clamps 66 to flexible conductors 97 having connection with a main conductor 98 and which cooperates with the conductor 21 to connect a generator 7 for supplying an etching current. The generator 7 is actuated by a motor 112. The motors 139 and 112 are supplied with current from service lines 113 and 114 through branch wires 115—116 and 117—118 connected with the terminals of the respective motors.

The control circuit 1 includes circuit closing switches 104—105—106, an ammeter 107, a volt meter 108, a voltage regulator 109, an automatic circuit breaker 110, a timing switch 111, a thermostatic switch 137 and a push button switch 126, all preferably mounted on a common panel in convenient position relatively to the etching apparatus. As shown in the drawing, the switches 104 and 105 are connected in the branch conductors 116 and 118 leading to the respective motors.

As previously mentioned, the positive terminal of the generator 7 is connected directly with the conductor 98 leading to the terminal clamps which support the plate to be etched, but the negative terminal thereof connects with the switch arm 119 of the circuit breaker 110 by means of a conductor 120. The circuit breaker switch arm, when closed, engages a contact 121 forming a part of an ammeter shunt 122, which in turn is connected with the bus bars connecting the cathodes 16 by the conductor 22, previously mentioned. The circuit breaker includes a holding coil 123 that is connected with the positive side of the generator 7 by a wire 124, also connecting with one of the terminals 125 of the voltmeter 108. The other end of the holding coil connects by a wire 126 with the switch 106 and the other terminal of the switch is connected by a wire 127 with the negative side of the circuit breaker switch arm 119. The wire 127 also connects with the other terminal of the voltmeter to complete the circuit therethrough.

It is thus obvious that when the switch 106 is closed, current will flow through the wire 124, holding coil 123, wire 126, switch 106, wire 127, conductor 120 to the generator 7, completing a circuit through the holding coil to hold the switch arm 119 in closed position. When the switch arm of the circuit breaker is closed upon energization of the holding coil, current flows through the conductor 98, plate terminal clamps 66, through the plate 2 being etched, through the electrolyte to the cathodes 16, through the conductor 22, ammeter shunt 122, circuit breaker 119 and conductor 120, back to the generator. The etching, therefore, will continue as long as the switch arm 119 is closed. The etching of the plate is so rapid that a few seconds over or under exposure of the plate to active electrolyte may result in over or under etching of the plate. I, therefore, provide the time switch for interrupting the etching circuit after an interval determined by practice to give the best etching effects for the character or kind of plate being etched.

The timing mechanism includes a switch arm 128 adapted for connection with the wire 126 through wire 129. The other side of the switch is connected by a wire 130 with one end of a resistance winding 131 that is connected by a wire 132 with the fixed contact 121 of the circuit breaker. Therefore, when the time switch is closed, current can also flow from the holding circuit through the resistance 131, the path of the current being as follows; from the positive side of the generator through the wire 124, holding coil 123, wire 126, wire 129, switch arm 128, wire 130, resistance 131, circuit breaker switch contact 121, circuit breaker arm 119, and conductor 120 back to the generator. The resistance 131 is, therefore, in series with the holding coil 123 to prevent injury thereto incidental to the heavy current required in the etching process. When the switch arm 128 is opened by the timing mechanism, the circuit through the holding coil 123 and resistance 131 is broken to effect release of the arm 119 of the circuit breaker, thereby breaking the etching circuit to suspend etching action on the plate.

In order to control the output of the generator the negative terminal of the generator winding 133 is connected by a wire 134 with the rheostat 109, through which a circuit is completed to the negative side of the generator by a wire 135 connecting with the switch arm 119. The positive side of the field winding, of course, is connected to the positive side of the generator as in conventional generator design.

Since the etching time is automatically controlled, it is not necessary for the operator to be in constant attendance, and he may be released for other duties while the plate is being etched. The apparatus is, therefore, provided with a signal to audibly advise the operator when the etching current is suspended. This is accomplished by connecting a buzzer or other signal 136 in the generator circuit, as now described.

Connected with the conductor 132 is a wire 132' leading to a thermostatic element 137, including a temperature responsive blade 138 that is movable to and from fixed contact 139 responsive to temperature of the resistance 131, the contact 139 being connected to a switch 140 by a wire 141. The switch 140 is coupled with the switch 105 controlling the agitator motor and is closed or opened simultaneously therewith. The switch 140 is connected with one terminal of the buzzer through a wire 142, and the other terminal of the buzzer is connected by a wire 143 with the circuit breaker arm 119 completing a closed circuit through the electrolyte solution.

The thermostat contact is closed whenever current is flowing through the holding coil 123, but due to the fact that the buzzer circuit is substantially shorted out when the circuit breaker is closed, the full voltage required to actuate the signal is not impressed on the signal circuit. However, when the circuit to the holding coil is broken to suspend the etching operation, a full current sufficient to actuate the signal will then flow from the generator through the wire 98, across the electrolyte to the cathodes, through the wire 22, ammeter shunt 122, wire 132, thermostat 138, wire 141, wire 142, buzzer 136, wire 143, wire 127, and conductor 120 back to the generator.

This current, however, is not sufficient to produce an etching effect upon the plate because the buzzer is in series with the electrolyte solution. The signal will continue to operate until the switch 105 is opened or until the coil 131 cools sufficiently to effect breaking of the buzzer circuit by means of the thermostat 137.

The ammeter 107 is connected to the shunt by wires 144 and 145, as in customary practice.

In operating an apparatus constructed as described, the clamps 66 are attached to the plate to be etched. The switch 105 is then closed to energize the motor 39 to effect oscillation of the plate and reciprocation of the agitator.

The switch 104 is then closed to energize the motor 112 to drive the generator, after which the time switch 111 is set so that the circuit to the holding coil will be broken after a definite time interval. The switch 106 is then closed to effect energization of the holding coil 123, which closes the circuit breaker 110, whereupon current from the generator flows from the plate through the electrolyte solution to the cathode bars, and back to the generator. The time switch will then be set so that the circuit to the holding coil will be broken after a definite time interval.

The amount of the etching current is, of course, controlled by regulating the field rheostat so that the ammeter 107 and the voltmeter 108 indicate that the desired current is flowing through the electrolyte solution. When the time switch breaks the circuit to the holding coil 123, the switch arm 119 will be released to break the etching circuit, whereupon current is caused to flow through the alarm circuit to energize the buzzer, thereby advising the operator that the etching process has been completed.

If the operator responds immediately to the alarm, he will open the switch 105 to shut down the agitator motor, however if he does not respond immediately to the alarm, the coil 131, which had been in series with the holding coil 123, cools off to cause the thermostat to break the buzzer circuit. The operator will then suspend the operation of the generator actuating motor 112 by opening the switch 104. The etched plate is then removed from its support on the rocker frame, completing the etching operation.

It is thus obvious that the etching process is stopped exactly at the desired point, and that there is no danger of over or under etching the plate.

What I claim and desire to secure by Letters Patent is:

1. In a circuit for supplying current to a load connected therewith, a current supply connected with said circuit, a switch connected in the circuit between the current supply and the load, a signal, a signal circuit connecting the signal with the current supply circuit for supplying a signal voltage when the switch is opened, a slowly opening switch in the signal circuit, and common means for closing the main switch and the signal switch and for effecting opening of the main switch after a predetermined time interval and permitting delayed opening of the signal switch.

2. In a circuit for supplying current to a load connected therewith, a current supply connected with said circuit, a main switch connected with the circuit between the current supply and said load, a signal, a signal circuit connecting the signal with the current supply circuit for supplying a signal voltage while the main switch is open, a thermostatic switch in the signal circuit, a timing circuit connected with the supply circuit, a solenoid in the timing circuit for closing the main switch, a timing switch in the timing circuit for breaking said timing circuit to effect opening of the main switch after a predetermined time interval whereby a signal current is caused to flow in the signal circuit, and a resistance energized while the main switch is closed in the zone of said thermostatic switch for effecting closure of the thermostatic switch when the main switch is closed to establish the signal circuit and to permit delayed opening of the thermostatic switch when the main switch is opened responsive to the timing switch.

3. In a circuit for supplying current to a load connected therewith, a current supply connected with said circuit, a main switch connected with the circuit between the current supply and said load, a signal, a signal circuit for supplying a signal voltage while the main switch is open, a thermostatic switch in the signal circuit, a timing circuit connected with the supply circuit, a solenoid in the timing circuit for closing the main switch, a timing switch in the timing circuit for breaking said timing circuit to effect opening of the main switch after a predetermined time interval, a resistance coil energized while the main switch is closed in the zone of said thermostatic switch for effecting closure of the thermostatic switch when the main switch is closed to establish the signal circuit and to permit delayed opening of the thermostatic switch when the main switch is opened responsive to the timing switch, and a switch connected with the timing circuit and the supply circuit to initially energize the solenoid for effecting closure of the main switch.

4. In a circuit of the character described, a circuit breaker in said circuit normally retained in circuit breaking position, a holding coil included in said circuit breaker, a holding circuit connected with the holding coil, means passing a current through the holding circuit to energize the holding coil for closing the circuit breaker, a heating element in the holding circuit energized by current flowing in said circuit, means for interrupting the holding circuit, a signal, a signal circuit energized when the circuit breaker is open, and a thermostatic switch in the signal circuit and located in the heating influence of said heating element to close the signal circuit when a heating current flows through the heating element and permit the signal circuit to be broken when current ceases to flow through the heating element upon opening of the holding circuit.

LOUIS E. HOLLAND.